May 29, 1934.  W. ACTON  1,960,985
MANUFACTURE OF PRODUCTS DERIVED FROM MAIZE
Filed Sept. 20, 1929
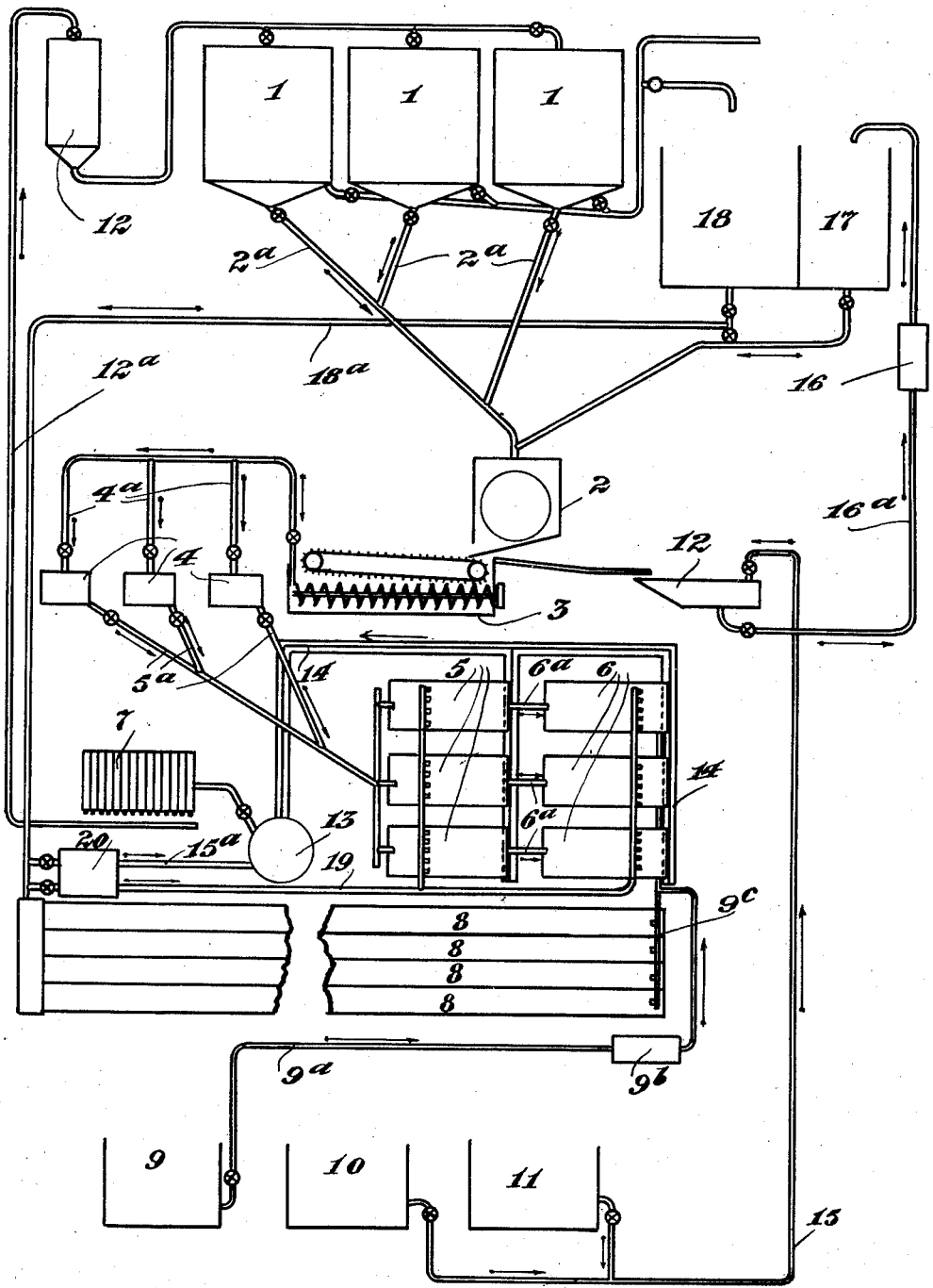

Patented May 29, 1934

1,960,985

UNITED STATES PATENT OFFICE 1,960,985

MANUFACTURE OF PRODUCTS DERIVED FROM MAIZE

Walter Acton, Paisley, Scotland, assignor to Brown & Polson Limited, Paisley, Scotland Application September 20, 1929, Serial No. 394,079
In Great Britain November 1, 1928

6 Claims. (Cl. 127—67)

This invention relates to the manufacture of the various products derived from maize, particularly maize cornflour, which is essentially a highly purified maize starch, industrial maize starch, maize gluten feed, and maize germ.

It is commonly known that in the treatment of maize by the usual methods there is a loss of about one fortieth part of the maize during the process of steeping; this is recoverable by evaporation of the steeping liquors. There is, however, a further loss of from one fiftieth to one twenty-fifth of the original maize during the process of wet milling, degerming and washing the corn, alkaline and fresh water washing of the separated starch and corn flour, and owing to the large volume of liquids and their low value in valuable solids it heretofore has not been commercially feasible to recover this loss. It has been common practice in the maize industry for certain of the wash waters to be returned to the process, such as, for example, using the germ wash water and the fine slop wash water to supply liquor to the degerming machine, but this was not possible with other liquors in many cases, as the growth of wild yeasts caused sliming of the sieves and the rapid growth of putrefactive organisms caused the resultant gluten feed and starches to be tainted.

The usual British factory treatment of maize consists essentially of steeping the maize, either in a weak aqueous solution of sulphur dioxide or in a more or less pure culture of the lactic acid bacteria.

In some cases the steep water from one steep is used for the next and so on, this is with the view of getting a more concentrated liquor which can be evaporated at low cost and ensuring efficient extraction of soluble matters. The maize, free from liquor, is now conveyed to a degerming plate mill which tears the grain and separates the germ. This mill is fed either with fresh water or water recovered from the germ washing plant or tables. The germ is removed by flotation in a starch suspension which has been returned to the process from the buhr stone mills or tables. In the germ separator the germ is floated in a starch suspension having such a specific gravity that the oil bearing germ or embryo shall float, while the starch bearing endosperm and the husks sink to the bottom and are removed by a conveyor which takes them to the buhr stone mills, which rupture all the starch bearing cells (previously weakened by the steeping process) and so liberate the starch. The resulting cream is passed over coarse slop sieves whereon it is washed, thence to fine slop sieves whereon any residue of fibre is removed.

The starch liquor, which now consists essentially of starch, disintegrated cell wall and protoplasm, mineral salts natural to the grain, and sulphur dioxide with its oxidation and perhaps reduction products, now passes to the tables whereon most of the starch is deposited but in part is carried on admixed in the so-called gluten.

The gluten liquors are settled for the recovery of protein bearing material which after admixture with the residues left on the sieves is used for manufacture of gluten meal.

The crude starch is removed from the tables to vats, wherein it is agitated with a caustic soda solution of approximately decinormal strength.

The starch is settled, water and the glutinous top surface removed. It is agitated with fresh water, settled, and the water run to waste. This washing is again repeated. Finally the starch is agitated with fresh water, neutralized to the required standard, then either filtered, or cast into cloth-lined perforated boxes, and dried.

This is essentially the process of manufacture which has been in use for many years. The pulp after the degerming mill has a pH value of about 3.5. This is sometimes increased by the addition of fresh water at various stages, and sometimes reduced by the oxidation of sulphurous acid to sulphuric acid.

Usually the pulp is warm with the maize coming from the steeps, but hitherto no investigation of the relationship of the growth of putrefactive bacteria to the pH value and temperature of the liquors has been attempted.

My invention has for its object to provide an improved process for the manufacture of products derived from maize whereby the wash liquors, in place of being run off, are returned to process.

Another object of my invention is to recover the products derived from maize which has heretofore been run to waste by the wash water.

A further object of my invention is to effect a better separation of the starch from the proteins on the starch tables.

A still further object is to recover the proteins carried off in the gluten from the starch tables.

In the manufacture of products derived from maize according to my invention the temperature of the material being treated is regulated in coordination with the regulation of the hydrogen ion concentration thereof in order to control the micro-biology of the liquors so that putrefactive organisms are inhibited, thus enabling liquors to be worked back in the process without giving rise to effluent and the only loss of water from the process being that involved in the drying of the various products.

The upper limit of temperature is fixed by the property of starch granules in general of swelling and undergoing a reduction of viscosity when maintained for a time, especially in an acid aqueous medium, at a temperature exceeding 46° centigrade or thereabout, whereas at a temperature below 38° C. bacterial growth becomes very rapid; but at temperatures between 40° C. and 45° C., in an aqueous medium of pH 4 or pH 3.5 there is no growth of putrefactive organisms for a reasonable time, and there is only a slight growth of acid and heat resistant organisms, none of which are injurious to the process of maize working. It is found, however, that starch separation on the tables takes place much better at an apparent isoelectric point in the vicinity of pH 6.5, at which point the protoplasmic cell structure undergoes a lysis that is the converse of coagulation and does not settle with the starch and permits the starch to separate more freely from it, thus giving a better separation.

Preferably my invention is carried into effect as follows:

Steeping is carried out as usual, except that when required the run-off water from one first steep, that is, sulphur dioxide solution of 0.32% in which only one lot of maize has been steeped, is retained.

The steeped corn goes through all the usual process of manufacture, but the liquors are treated as herein described, and for the sake of clearness in description I begin with the final wash waters of the finished starch.

The mixed wash waters and the final liquor from the boxes or filters are returned directly through a heater to the degerming mill, being used for washing the separated germ on its passage and delivered to a storage tank and the pH value regulated for use at the degerming mill at a temperature of approximately 46° C., which also should be the temperature of the steeped maize. When the maize is torn it is found that the whole pulp has an acid value of pH 4 or thereby. This is sufficient regulation of temperature and acidity, in normal conditions, to carry the process through germ separation, buhr stone mills, and to the first coarse slop sieves where the husks and fibre are washed with hot liquor obtained in the manner hereinafter ascertained. The bran is conveyed to a vat in its wet state.

The starch liquor, which passes through the coarse sieves, then passes on to fine sieves and the residue which gathers towards the discharge end thereof is washed with hot liquor likewise obtained in the manner hereinafter described; the residue can either be added to the coarse slop or returned to the germ separator.

The liquor passing those sieves is now joined by a stream of the strongly alkaline liquor from the alkalizing vats, so that the mixture will be at approximately pH 6.5. This mixture, at a temperature of about 40° C., is fed on to the tables, where the starch settles in a very pure state, while the lysed protein passes on with the water.

The gluten liquor is now acidified by means of a supply of the partly used steep water before mentioned, and the total after heating to 40° C. is divided into two streams, one portion being used for washing the residue on the slop sieves.

The acts of reacidifying and heating this liquor causes the lysed protein to re-coagulate in large masses which will not pass through the sieves, hence the protein is separated.

The second portion of the acidified and heated gluten liquor is mixed with the fibrous residue of bran from the sieves, so that the product can be pumped to filter presses to form the product which, when recovered and dried, becomes gluten feed. The filtrate from the presses is at once pumped up through a sulphur dioxide tower and the solution becomes the steep liquor used for steeping the maize preliminarily to the process of separation.

The flow liquor and the method of use of the various liquors are indicated in the accompanying diagram of which 1, 1, 1, are the steep tanks in which the maize is steeped, 2 the degerming mill to which the steeped maize is led by pipes 2$^a$, 3 the germ separator, 4 are buhrstone mills to which the degermed maize is conducted by pipes 4$^a$ and from whence the starch liquor is conducted on to the coarse slop sieves 5, 5, 5, by pipes 5$^a$.

The liquor which passes through the coarse seive, is conducted by the pipes 6$^a$ on to the fine slop sieves 6, 6, 6, while the residue on the sieves passes by a gutter pipe 14 to the tank 13.

The starch liquor which passes through the fine slop sieves is now admixed with the alkaline liquor supplied through pipe 9$^a$ and heater 9$^b$ from the alkalizing tank 9 and the mixture so obtained flows on to the starch separating tables 8, 8, 8, 8, through pipe 9$^c$. The starch which deposits on the tables is now transferred by any suitable means to the alkaline vat 9, wherein it is washed in a dilute solution of caustic soda and settled.

The alkaline water is run off and utilized as described, and the starch washed with fresh water in vats 10, 11 wherein at the final washing, the starch mixture is neutralized by means of any convenient acid, whereafter the starch is separated by any convenient means as filtration or boxing and dried, the separated liquor being returned to process.

The return flow of the various liquors is as follows:—The fresh washing water from vats 10, 11 is returnd via the pipe 15 to the germ washing sieve 12, wherein the separated germs are washed free from starch. This liquid now passes through a pipe 16$^a$ to a heating apparatus 16 and is discharged hot into the alkaline storage tank 17. The liquid run off from steep vats 1, 1, 1, is run into the acid storage tank 18 and a mixture of the contents of tanks 17 and 18 in the proper proportion are mixed with the maize at the degerming mill 2.

A further portion of the acid liquor from tank 18 is run into the bran storage tank 13 through pipes 18$^a$ and 15$^a$. The liquid from the starch separating tables is regulated to pH 4 by means of partly used acid steep water, heated to a temperature of about 40° C., and utilized as follows. Part is conducted to the bran storage tank 13 by pipe 15$^a$ and the remainder returned by the pipe 19 to wash the residue of the coarse slop sieves 5, 5, 5, and the fine slop sieves 6, 6, 6, whereafter this portion of said liquor again becomes part of the liquor from the starch tables. The liquor which passes through the pipes 15$^a$ and 19 is passed through a heater mixing apparatus 20.

The now fluid contents of storage tank 13 are pumped through the filter press 7, the contents of which when dried become maize gluten feed. The liquor from the filter press 7 is taken directly to the sulphur towers 12 by pipe 12$^a$ in which it is converted into sulphur dioxide solution used for steeping the maize, or, alternatively can be regulated in hydrogen ion concentration to the proper degree and inoculated with a culture of any suitable acid generating micro-organism.

It will be understood that heaters, pumps, valves and other fittings may be introduced as desired.

What I claim is:—

1. In the manufacture of products derived from maize the process which consists in the regulation of the temperature in co-ordination with the regulation of the hydrogen ion concentration of the material being treated to control the microbiology of the liquors so that putrefactive organisms are inhibited, thus enabling liquors to be worked back in the process without giving rise to effluent and the only loss of water being that involved in drying of the various products and in regulating downwards the hydrogen ion concentration of the starch cream fed to the tables to the point where the proteins are partly lysed or swollen thereby giving a more complete separation of protein and starch.

2. In the manufacture of products derived from maize the process which consists in the regulation of the temperature in co-ordination with the regulation of the hydrogen ion concentration of the material being treated to control the microbiology of the liquors so that putrefactive organisms are inhibited, thus enabling liquors to be worked back in the process without giving rise to effluent and the only loss of water being that involved in drying of the various products and in supplying alkaline wash water from the starch alkalizing vat to the starch liquor fed to the tables to regulate the hydrogen ion concentration of the starch liquor to the point where the proteins are partly lysed or swollen.

3. In the manufacture of products derived from maize the method which consists in returning the wash waters used in purifying the starch, heating said wash water and supplying same together with sulphur dioxide steep water to the degerming mill, the temperature of the wash waters and the admixture thereof with the steep water being so regulated that the pulp delivered by the degerming mill has a temperature of about 40 to 46° centigrade and a pH value of between 4 and 3.5, separating the endosperm and husks from the germ, subjecting the endosperm and husks to the action of a mill to rupture the starch cells, delivering the starch cream so formed to a sieve, washing the cream residue on the sieve with gluten liquor received from the starch tables and admixed with steep water, admixing the starch liquor from the sieves with alkaline wash water from the alkalizing vat and regulating the temperature of the admixed cream and alkaline water so that it has a temperature of about 40° C. and a pH value in the vicinity of 6.5, the starch cream being thereafter delivered to the tables and the starch separated on the tables, transferred to alkalizing vat and subsequently washed and dried.

4. In the manufacture of products derived from maize the method which consists in returning the wash waters used to purify the starch, heating said wash waters and supplying said waters with partly used steep water to the degerming mill to which the steeped maize is fed, separating the endosperm and husks from the grain of the degermed maize, grinding the husks and endosperm, supplying the starch cream so formed to a sieve, washing the residue on said sieve with gluten liquor received from the starch tables, mixing the residue from the sieve with gluten liquor, filtering the residue, charging the separated liquor with the requisite sulphur dioxide, returning the liquor to the steeping vats, mixing the starch cream from the sieve with alkaline liquor to the starch tables, the temperature of the starch liquor being regulated to about 40° centigrade and the pH value thereof to about 6.5 by the admixture thereof with the heated alkaline liquor, delivering the gluten liquor separated on the tables partly to the sieve and partly to the residue from the sieve, treating the starch in an alkalizing vat and thereafter washing, separating and drying the starch.

5. In the manufacture of products derived from maize the process which consists in the regulation of the temperature in co-ordination with the regulation of the hydrogen ion concentration of the material being treated to control the microbiology of the liquors so that putrefactive organisms are inhibited, thus enabling liquors to be worked back in the process without giving rise to effluent and the only loss of water being that involved in drying of the various products, returning gluten liquor from the starch tables to the sieve and supplying partly used acid steep water to said gluten liquor, the reacidifying and heating of the gluten liquor causing the lysed protein to coagulate in masses which will not pass through the sieve.

6. In the manufacture of products derived from maize the process which consists in steeping the maize, degerming the steeped maize, separating the germ from the husks and endosperm, grinding the husks and endosperm, passing the starch cream so formed to a sieve, passing the starch liquor from the sieve to the starch tables, separating the gluten liquor from the starch, passing the starch to an alkalizing vat, washing and drying the starch, returning and heating the wash water to the degerming mill to regulate the temperature and hydrogen ion concentration of the pulp delivered by said mill so that putrefactive organisms are inhibited, mixing the alkaline wash water from the alkalizing vat with the starch liquor fed to the tables to regulate the hydrogen ion concentration of the starch liquor to the point where the proteins are partly lysed or swollen, mixing gluten liquor from the tables with partly used acid steep water and supplying the reacidified gluten liquor to the sieve to cause the lysed protein to re-coagulate in masses which will not pass through the sieve.

WALTER ACTON.